United States Patent [19]

Llinas et al.

[11] 4,450,530

[45] May 22, 1984

[54] SENSORIMOTOR COORDINATOR

[75] Inventors: Rodolfo R. Llinas; Andras J. Pellionisz, both of New York, N.Y.

[73] Assignee: New York University, New York, N.Y.

[21] Appl. No.: 286,979

[22] Filed: Jul. 27, 1981

[51] Int. Cl.[3] ........................ G06G 7/60; G06F 15/42

[52] U.S. Cl. ...................................... 364/513; 364/413

[58] Field of Search ............... 364/513, 815, 817, 729, 364/730, 413, 415, 417, 200 MS File, 900 MS File, 300; 307/201; 382/14, 15; 328/55; 128/731, 732

[56] References Cited

U.S. PATENT DOCUMENTS

| | | | |
|---|---|---|---|
| 3,287,649 | 9/1963 | Rosenblatt | 328/55 |
| 3,950,733 | 4/1976 | Cooper et al. | 364/469 X |
| 4,254,474 | 3/1981 | Cooper et al. | 364/900 |
| 4,308,584 | 12/1981 | Arai | 364/513 |

OTHER PUBLICATIONS

Reynolds et al., *Neuroelectric Research,* Chapter 42, pp. 392–401, Charles C. Thomas, Publisher, 1971.

Capowski–"The Neuroscience Display Processor" Computer, Nov. 1978, pp. 48–58.

Pellionisz and Llinas, *Neuroscience,* vol. 4, pp. 323–348, (Pergamon Press, 1979).

Pellionisz and Llinas, *Neuroscience,* vol. 5, pp. 1125–1136, (Pergamon Press, 1980).

Robinson, *Biological Cybernetics,* vol. 46, pp. 53–66, (Springer–Verlag, 1982).

Levi–Civita, *The Absolute Differential Calculus,* pp. 67–71, (Dover, New York).

Einstein, *The Principle of Relativity,* pp. 120–125, (Dover, New York).

*Primary Examiner*—Joseph F. Ruggiero

*Attorney, Agent, or Firm*—Lyon & Lyon

[57] ABSTRACT

An information system that enables a higher dimensional physical execution of an object than it is physically measured by a sensory apparatus, using oblique systems of coordinates for processing information in covariant vectorial form and providing output information in contravariant vectorial form.

15 Claims, 19 Drawing Figures

COVARIANT-CONTRAVARIANT TRANSFORMATION THROUGH THE MATRIX OF THE METRIC TENSOR

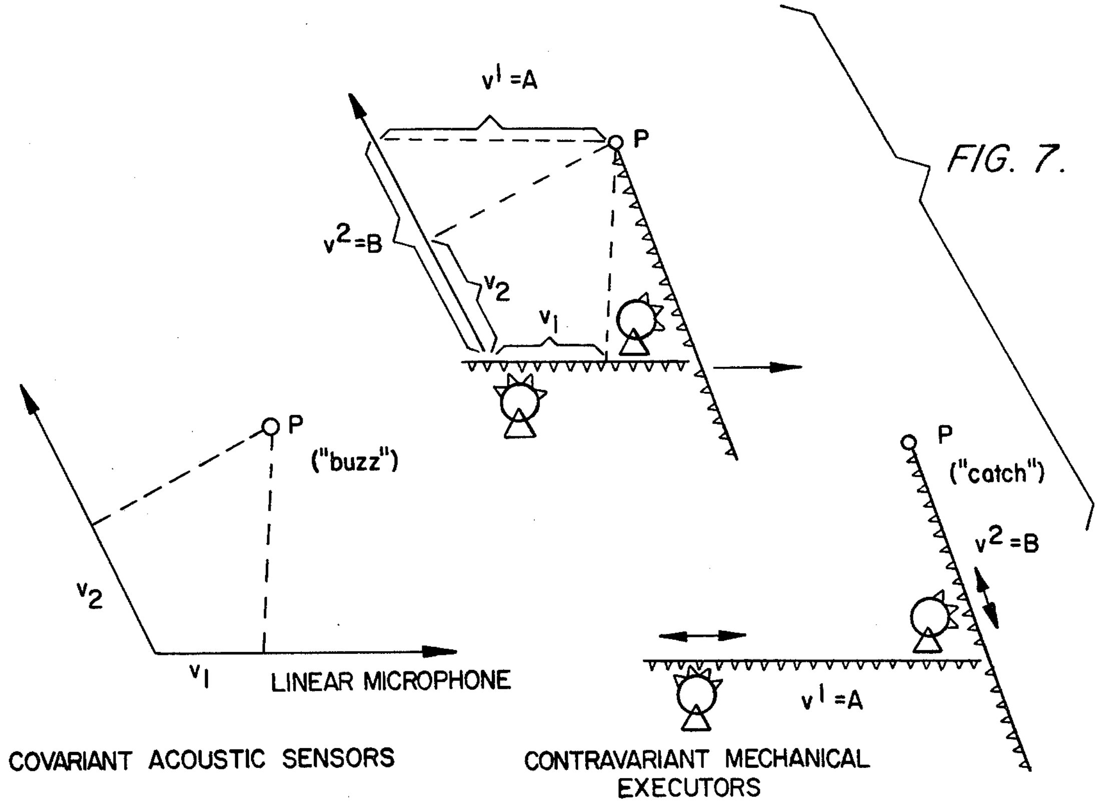
FIG. 7.
FIG. 8.
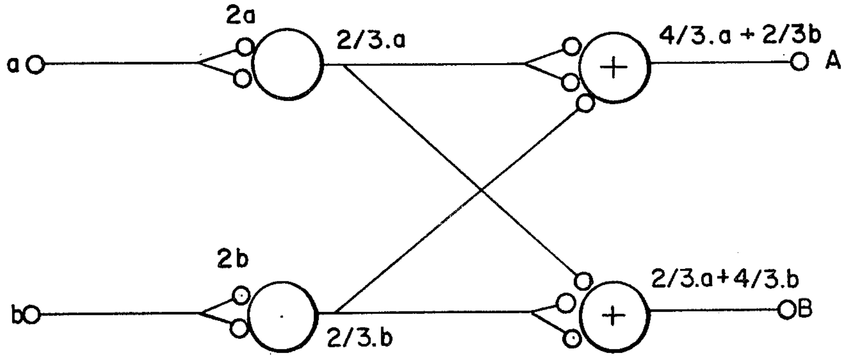

METRIC TRANSFORMATION OF
SIMULTANEOUS
SPACE COORDINATES

TRANSFORMATION OF NON-SIMULTANEOUS SPACE-TIME COORDINATES VIA SPACE METRIC

PREDICTIVE SPACE-TIME METRIC

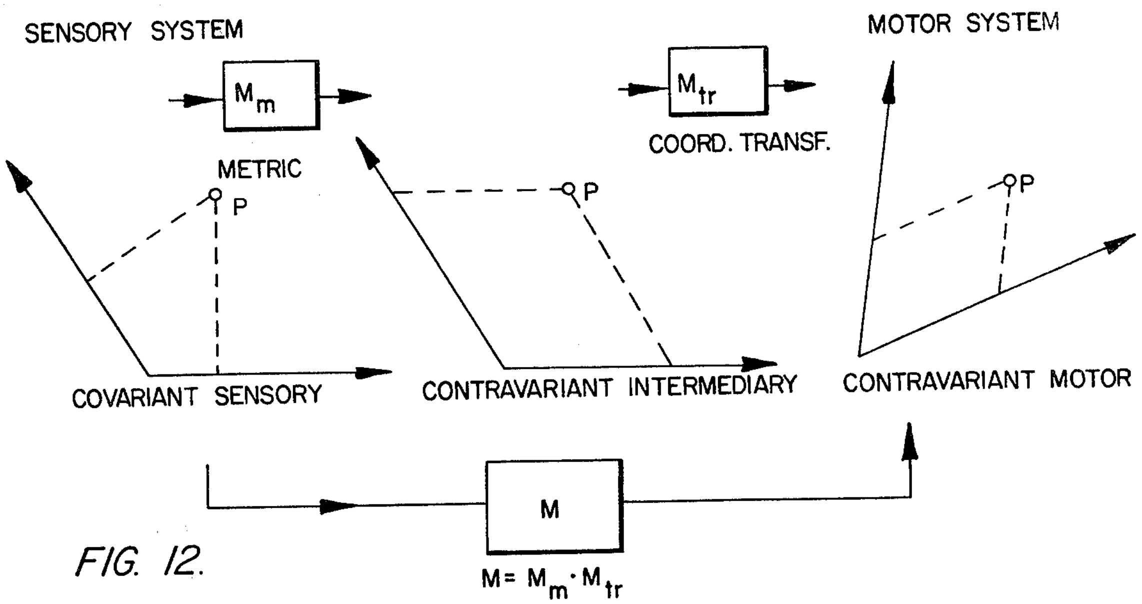
FIG. 12.
FIG. 13.
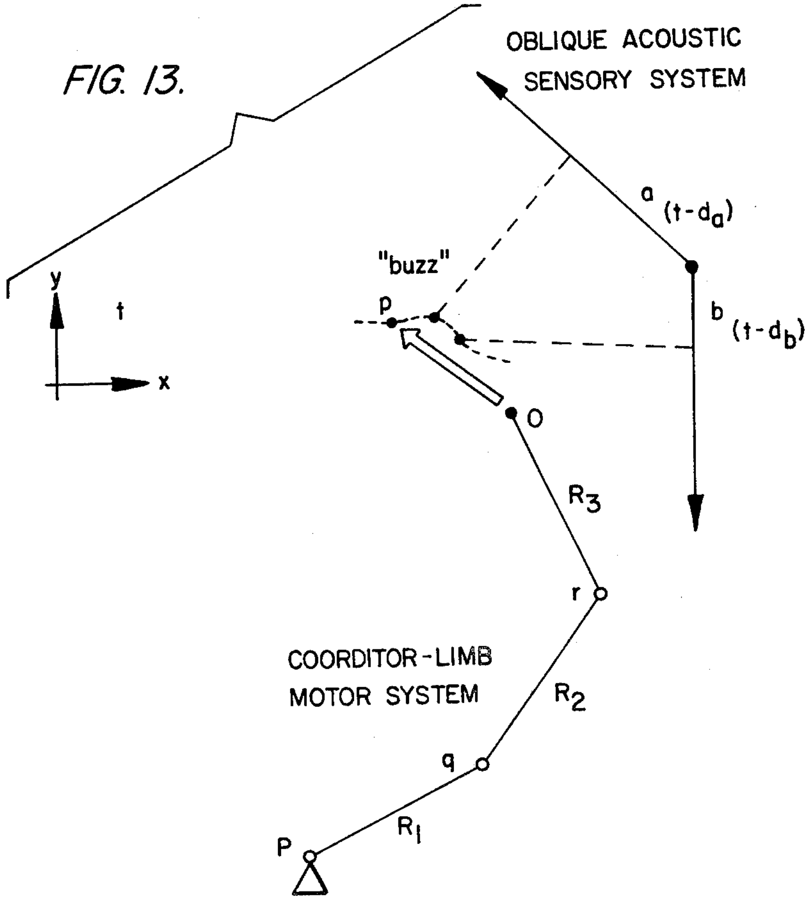

SENSORIMOTOR COORDINATOR

FIELD OF THE INVENTION

The invention discloses a control paradigm for systems which are composed of many sensory (input) elements and many executor (motor output) elements and where there must be a certain orderly relation between the functions of the inputs and outputs. In a living system, from which this invention is inspired, this relation of the input-output elements is generally called "sensorimotor coordination". It is known that this function is established by the cerebellum, a part of the brain, which imposes a characteristic relation between the multivariable senses (vision, hearing, etc.) and multivariable executors (e.g., musculoskeletal system of the body). This enables us, for instance, to bring about space-time coincidences of our moving body and fast moving targets (e.g., in playing baseball). As it became possible to model the manner in which the cerebellum performs this function, the control paradigm learned from brain research became available to be put into practical use in any similar multivariable input-output system.

A most obvious area for the use of the invention is the field of robotics, in which coordination of movements of many parts of a complex executor system poses a formidable problem of finding a suitable control paradigm. For example, the coordinated control of artificial limb movements or the artificial control of the movements of existing limbs, are immediate possibilities for application. A further application is the coordinated control of non-anthrophomorphic robots, such as industrial mechanisms that do not mimic living bodies but still pose the control problem of coordinating the high number of their executor elements in order to achieve, e.g., precise space-time coincidences.

The invention is also useful for the control of any device that consists of a multiple effector system and executes tasks that are presented by a multiparameter input system whether by electrical, electronic, mechanical or pneumatic or other means.

BACKGROUND OF THE INVENTION

The problems of sensorimotor coordination do not lend themselves readily to conventional computer analysis. It is well known that many functions performed readily by the human brain are difficult to perform by computer, such as recognition of patterns which vary within certain limits, e.g., recognition of signatures or faces. The complex features of sensorimotor coordination have proven especially difficult to control by conventional means.

A major distinction of the present invention from conventional computers lies in the fact that the latter employ mathematical operations based upon the logic of Boolean algebra. The present invention, by contrast, employes geometrical operations as its basic function. The class of information processors embodied in the present invention is not computational, but geometric.

In order to distinguish the devices of the present invention from prior art computers, new terminology is employed. The basic device, which is termed a Cognitor, processes multivariant inputs from sensory elements and coordinates a multivariant output effector system. The Cognitor operates as a geometrical processor that handles information, expressed in terms of vectors, using oblique systems of coordinates. A related device, applying the Cognitor processing system to sensorimotor control with space-time coordination, is termed a Coorditor. The Coorditor incorporates additional processing elements to accomplish specific space-time coordination. Thus the Coorditor is applicable in situations where a time delay in the sensory or effector systems requires additional extrapolation (termed herein "lookahead"), to coordinate output motions with motions of the external world.

The present invention was achieved by studies on the nature of brain function. Progress in modeling the principles of brain function has been hampered by a widespread fallacy that the algebraic logic of computers and the information processing of the brain were fundamentally analogous. However, two information processors in the prior art represent intermediary stages between conventional computers and the present invention. These are the Perceptron (Rosenblatt, U.S. Pat. No. 3,287,649) and the Nestor Module (Cooper et al, U.S. Pat. No. 3,950,733). Both information processors are based upon vectorial processing operations. In contrast, a main feature of the present invention lies in the fact that its operating principle (and, in consequence, its operating hardware) necessitates a distinction between covariant and contravariant vectors, a distiction absent in the prior art.

A central concept herein is the idea of coordination. As understood from the field of brain function studies, coordination is achieved when the multivariant sensory input information from the external world is processed in such a way that multiple effectors are activated in a concerted manner to achieve a desired action with respect to the external world. For example, a tennis player tracking the flight of the ball coordinates the concerted action of his muscles to intercept the ball at the desired time and in the desired manner. The devices of the present invention function to coordinate such sensor inputs and motor effector outputs, and are therefore termed sensorimotor coordinating devices. It will be understood that the terms "sensory" and "motor" are not limited to a biological context, but are intended to include any sort of informational input, e.g., electromagnetic radiation, acoustic vibration, magnetic and thermal variations, etc., and any sort of effector output, e.g., electrical, mechanical, pneumatic, acoustical, etc., respectively.

It is of fundamental importance, that in the Cognitor systems vectorial variables are mathematically expressed in oblique frames of reference; where the angles between the coordinate axes are usually not right angles. It is known that in a non-orthogonal system of coordinates a vector is either covariant or contravariant. The Cognitor systems can be recognized formally by the fact that they distinguish between two kinds of vectors. Using oblique systems of coordinates it is not sufficient to deal with vectorial quantities without explicitly distinguishing between the two possible kinds, since not only their components are numerically different but there is also a fundamental difference between the processes by which they are established, as well as profound differences in their ultimate usefulness in application.

In the Cognitor and Coorditor systems, covariant and contravariant vectors are transformed from one to the other. Covariant-contravariant transformations can be accomplished by any of several known means. It is convenient to employ a metric tensor to accomplish such transformations. It is well established in tensor analysis that if the geometry of an abstract mathematical space is determined by a metric tensor, then all properties of the affine space are formally expressible (e.g., distances of points, angles between lines in the space, movements along geodesic lines, etc.). Although geometrical properties are elegantly and concisely handled by tensor analysis, the present invention lies not in the use of the particular method of tensor analysis, but the utilization and development of a paradigm of coordinated control using the concept of multidimensional geometric transformations, expressed in oblique systems of coordinates. Thus, the key for separating the prior art from this invention is whether there is a distinction expressed between the two kinds of vectors. While in tensor analysis these are normally called covariant and contravariant vectors, it will be understood that other terms representing the same concept, such as orthogonal projections and parallelogram components, etc., are deemed equivalent.

The other significant feature of this invention is that it utilizes the understanding of the functioning of specific brain regions for the design of non-biological devices. In this case, this part is the cerebellum, which is the best known region of the brain, regarding both its structure and its function. Accordingly, throughout the past two decades a great deal of effort has been made in understanding the function of this organ with the expectation in mind that brain research would eventually yield not only an understanding of how a part of the brain works, but also of how such knowledge could be put into practical use. The invention is a result of the realization that the cerebellum achieves the task of motor coordination via a covariant-contravariant vector-transformation; that is, the cerebellum serves as a space-time metric tensor. It is already possible to determine some characteristic features of the class of device that could be built upon this understanding. This constitutes the Coorditor space-time coordinator device.

SUMMARY OF THE INVENTION

The present invention provides an information processing system, termed a Cognitor, using oblique systems of coordinates for processing input information in covariant vectorial form and providing output information in contravariant vectorial form, comprising a covariant embedding means for expressing an n-dimensional vector by N components, where N is greater than n, a covariant-contravariant transformer for obtaining contravariant expressions of the covariant vectorial expressions, and a contravariant vectorial expression means for providing output information relevant to an external invariant.

The invention further provides a sensorimotor device, termed a Coorditor, for coordinating sensory input signals with motor-effector means, comprising a covariant embedding system operating upon the sensory input signals, a temporal extrapolation system to compensate for any time delays in the sensory input system, a covariant-contravariant and coordinate transformation matrix, and a contravariant embedding system for transferring output signals to the motor-effector means. The invention further provides a method of processing information using oblique systems of coordinates comprising embedding information in the form of a covariant vector whereby an n-dimensional vector is expressed by N components, where N is greater than n, transforming the covariant vector to a contravariant vector, and expressing output information in the form of a contravariant vector.

The invention further provides a method of coordinating sensory input signals with motor-effector means comprising embedding sensory input signals in the form of a covariant vector in an oblique coordinate system, whereby an n-dimensional vector is expressed by N components, where N is greater than n, temporally extrapolating the covariant vector to compensate for any time delays in the sensory input system, transforming the covariant vector to a contravariant vector, thereby producing a contravariant output vector, and activating the motor-effector means with the contravariant output vector.

The geometric transformations between covariant and contravariant vectors are expressible as tensorial transformations. A metric tensor means is contemplated as the preferred embodiment for carrying out covariant-contravariant transformations, although other suitable methods may be employed. The temporal extrapolations are preferably carried out by means of Taylor series expansions. The Cognitor and Coorditor devices are preferably constructed of an over-complete number of the operating elements so that the breakdown or misperformance of some components is at least partially compensated for by others.

DESCRIPTION OF THE DRAWINGS

FIG. 7. Identical two-dimensional oblique sensory and motor coordinate systems. The 120° sensory coordinate system is composed of two sensors (e.g., linear microphones when detecting a sound source at P). The sensors yield the covariant $v_i$ components of the location. The rudimentary motor system on the right uses an identical frame of reference (e.g., by moving rods A and B into directions 120° apart). Such a sensorimotor system would immediately work if the covariant sensory coordinates were transformed into contravariant motor coordinates.

FIG. 8. "Neuronal network" serving as a metric tensor. The contravariant metric of the 120° coordinate-system (expressed as a 2×2 matrix in FIG. 6) can be implemented as a set of connectivities among two input and two output elements, called "neurons" which may, in practice, be conventional electronic components performing the described functions. "Neurons" multiply an input signal by a constant (the neurons marked by dots), or sum the input signals (marked by pluses). "Neurons" form a network by being connected to one another via a specific number of connections, the number of lines from the i-th input neuron to the j-th output neuron being proportional to the ij-th matrix element of the metric sensor.

FIGS. 6 and 8 combined provide a most simple sensorimotor system, where the covariant sensory components are transformed through a simple network of "neurons" into contravariant motor components, executed in the coordinate system shown in the right. Neither the sensor nor the motor signals are permitted to incorporate any time delay. Thus, all signals are synchronous, referring to simultaneous events. The time functions of the "neurons" are shown in the bottom part of the figure.

FIG. 12. Sensorimotor system with different sensory and motor coordinate-systems. The system functions similarly to the one with identical sensory- and motor-frames of reference, but an additional matrix has to be included that performs a coordinate-system transformation on the contravariant motor vector. Thus, the matrices of the metric tensor and the coordinate system transformation matrix could be combined into a single matrix.

FIG. 13. The tensorial concept of Coorditor-limb system. A space-time curve is the object of detecting and achieving space-time coincidence. The points of the moving target are normally expressible in x, y, z, t Euclidean frame of reference with centralized clock-time. In the case shown, z is omitted, since the limb moves in the two (x,y) space dimensions only. Together with the time, the target is normally considered three-dimensional (x,y,t). This moving target is being monitored by a sensory system (similar to the ones used before) that is an oblique, non-simultaneous system of a and b coordinates. From a and b vectorial components the OP displacement of the arm has to be generated in the form of OP (p,q,r,t), where p, q, r are the three angles of the three-segment arm. The fact that OP (x,y,t) and OP (p,q,r,t) are all vectorial expressions of the same physical object in different frames of reference is the basis of the tensorial concept of the Coorditor.

FIGS. 2, 3). From the p, q, r covariant components by means of the contravariant metric tensor $g^{ii'}$ of the p, q, r-space, the physical contravariant OP (p,q,r) components can be obtained (lower part of the figure).

FIG. 16 A shows the circuitry units (implemented by electronic operational amplifiers or any other conventional means) that perform the "neuronal" functions necessary for the Coorditor. FIG. 16 B shows how a matrix generator that serves as a metric tensor may be built from these circuitry units. Note that the $g^{ij}$ multiplicator element is incorporated in every line for all i and j. FIG. 16 C is a possible implementation of the temporal extrapolator that compensates for the delays in the sensory and motor executor elements. FIG. 16 D puts the circuitry diagram together: this figure is basically an elaboration of FIG. 15, using the components shown in FIG. 16 A,B,C. The temporal extrapolators and matrices of metric tensors are shown only schematically both on the sensory and in the motor part of FIG. 16D, since their detailed circuitries are explained in FIGS. 16 B and C.

Figure 1:
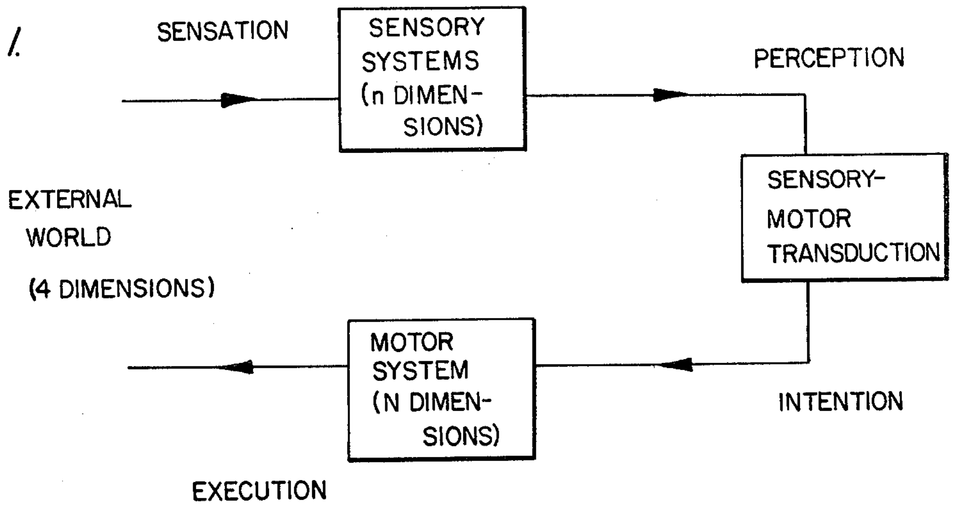
FIG. 1. Overall scheme of sensorimotor system. Primary signals represent a sensation vector that the sensory system processes into a perception vector. The sensory-motor transduction is a conversion of perception into intention, an n-N dimensional transformation. Then the motor system executes the intended movement vector. The sensation- and intention-vectors are identified as beng covariant vectors, while the perception- and execution-vectors are contravariant vectors. The sensation and perception vectors are expressed in sensory frame of reference, while the intention and execution vectors are expressed in the motor coordinate system.

DESCRIPTION OF THE INVENTION (1) Cognitor System: Cognitive Tensorial Processor.

A Cognitor-type information processing system is a geometrical processor that handles information, expressed vectorially, using oblique systems of coordinates. The term "oblique system of coordinates" means a set of coordinate axes where the angles between the axes are not necessarily of 90 degrees. The fundamental significance of using oblique systems of coordinates in an information processor was learned from brain research which suggested that such reference frames are, of necessity, used by the cerebellum. Thus, a Cognitor system possesses n number of input elements (sensors), where each sensory signal represents a vectorial component expressed in an oblique frame of reference. There is no constraint to the dimensionality of either the input or output frame; the number of axes and their directions can be different in each. From the above, it follows that the language that best describes the events in a Cognitor is tensor analysis, a geometrical language that applies to any kind (including oblique) frame of reference. In these terms any vector that is attributed to an invariant may have either orthogonal projection-type components or parallelogram-type components (the former called covariant vector, the latter contravariant vector). Thus, a Cognitor system performs geometrical operations by dealing with covariant and contravariant vectorial expressions of particular physical objects, e.g., transforming one kind into another. There are several operations in which these different vectors offer different advantages.

(A) Covariant embedding.

It is a basic operation to be able to express an n-dimensional vector by N components, where N is greater than n. Such an increase in dimensionality frequently occurs in sensory systems, for example, when a location in the physical space (a three-dimensional point) is detected by more than three sensory elements (e.g., hundreds of neurons in the brain). This condition can be described by saying that relative to the complete set of dimensions of the external object the number of sensors is over-complete. In the previous art, the phenomenon of having an apparently higher-than-necessary number of neuronal elements in the brain was often termed as "redundancy". The difference between "redundancy" and "over-completeness" is that redundant elements are all functionally equivalent, whereas in an overcomplete system each of the elements represents a different coordinate axis.

The apparent similarity between redundant and overcomplete systems is that either system may lose some of the components without an apparent loss in the performance of the whole system. It is of the essence in the present invention that the (sensory) embedding of an n-dimensional object into an N-dimensional space may be uniquely performed by using covariant decomposition of the n-dimensional contravariant vector in the tangent plane of the N and n spaces. The principle of covariant embedding will be illustrated in concrete applications, infra.

(B) Contravariant (physical) vectorial expression.

The previous covariant expression of vectors offers advantages in the input (sensory) part of the system. However, in oblique frames of reference covariant vectorial components do not physically add up to the invariant that they represent. In contrast, if the invariant is represented in the same frame of reference by the so-called parallelogram components, these contravariants will physically add up to the invariant. Thus, in a Cognitor system that connects to the external world by its effectors, the output must be provided in a contravariant form. Since the input- and output-elements are expressed in different (covariant and contravariant) forms, it follows that there must be means to transform one to the other. It is of central importance to the invention of Cognitor systems that they contain such a covariant-contravariant transformer unit, which is capable of transforming a covariant vector into its contravariant counterpart (or vice versa).

(C) Covariant-contravariant transformer.

It is known from tensor analysis that the covariant and contravariant expressions of a vector may be obtained from each other by a mathematical process employing a metric tensor that characterizes the geometry of the vector space. The metric tensor may be numerically expressed, in a given system of coordinates, either by a matrix of n×n constants (for an n-dimensional space whose geometry is uniform; i.e., the space is "flat") or by a matrix in which the components depend on the location in the n-space where the vector is pointing. This transformation can be symbolically expressed as:

$$v_n = g_{nn'} \cdot v^{n'}$$

(The covariant vector may be obtained from the contravariant vector via a multiplication by the covariant metric)

$$v^n = g^{nn'} \cdot v_{n'}$$

(Contravariant from covariant: via the contravariant metric)

In the prior art, where the vectors have not been specified as either covariant or contravariant ones (e.g., because orthogonal systems of coordinates were used where they are identical), the above concept, that is central to Cognitor systems, could not be used at all for lack of the necessary distinction between the two types of vectors.

The above (a)–(b)–(c) operations, utilizing covariant and contravariant vectorial forms and transforming one to the other, furnishes the Cognitor system with numerous capabilities in dealing with a geometry of abstract spaces. For example, since the invariant distance between two points is mathematically equivalent to the inner product of the covariant and contravariant expressions of the vector from one point to the other, such distinction of covariant and contravariant vectors enables the Cognitor systems to make geometrical decision-making, based on the $d^2$ distance:

$$d^2 = v^{n'} \cdot v_n = v_n \cdot v_{n'} \cdot g^{nn'}$$

It is also known, for further example, that angles between lines in a space can be determined by knowing the metric tensor, or that the geodesic lines in a vectorspace are fully determined by the metric. Thus, it is central to the Cognitor systems that in their internal abstract space the geometry be determined by a suitable metric. In these terms the Cognitor is a system by which the geometry of the external world is embedded into an internal hyperspace, so that the external geometry becomes a structure of the tangent space of the internal embedding space. The question of how the internal space is structured so that the external geometry fits into it can be resolved either by predetermining a metric tensor or building one in correspondence with the motor experience. It is emphasized again that if the space has a non-modifiable flat geometry then such a metric tensor may simply be a matrix of constant elements (e.g., a wiring system between the input and output elements). On the other hand, in cases where a Cognitor system deals with the geometry of a curved space or it actually builds up the geometry from a more or less amorphous space, the embodiment of a metric tensor requires a matrix of non-constant, modifiable elements. Nevertheless, no matter how and in what form the metric tensor becomes available, the essence of the invention is the ability to convert covariant and contravariant vectors into one another. Therefore, while a metric tensor and means functioning as a metric tensor are preferred embodiments for operating the Cognitor system, there are other known expedients which can perform the equivalent function of covariant-contravariant transformation, which could be employed.

(2) Coorditor: A Cognitor-Type Device for Space-Time Coordination.

The Coorditor, a device fashioned after the cerebellum, is a Cognitor type system: it possesses multi-dimensional sensory input and a multidimensional effector output and performs geometrical transformations of the vectorial signals within the system. What makes the Coorditor particular within the class of Cognitor systems is that its input and output expresses, by multidimensional vectors, the four-dimensional object of space-time. This is contrasted with the general Cognitor which typically deals with the physical reality not directly but in a more abstract, detached manner. The geometrical operation of the Coorditor is equivalent to the sensorimotor coordination performed by the central nervous system: it senses a space-time event by covariant embedding, and moves the effector elements to coincide in space and time with the detected target. This function is achieved by using the contravariant version of the vector, and this is possible because of the ability of covariant-contravariant transformation via a space-time metric tensor. This summed-up overall function is explained below in greater detail.

The above principles of the Coorditor can obviously be put into use in numerous applications, whenever a space-time coincidence of a moving target and an interceptor is to be achieved. The biological model, for which the cerebellum is used, is the motor coordination of a living body, e.g., coordination of a limb when it moves to intercept a fast-moving object, such as in hitting a baseball with a bat. Therefore, as a most obvious exemplary demonstration device, the invented Coorditor is embodied herein as an artificial limb-like device that intercepts a moving target. The difficulties resolved by this device are:

(a) Achieving a space-time coincidence by a system in which the sensory and motor signal propagation speed, the speed of movement of the target and the speed of the movement of interceptor are all in the same order of magnitude; and (b) Coordinating the movement of a (mechanical) system which has a higher degree of freedom than the number of dimensions of the space-time event-point that is represented by the moving target.

However, since the two tasks of introducing the concepts as concisely as possible and of presenting a practical demonstration device are rather different, the Coorditor device will be described through two examples. One is a rather abstract and simple coordinate-system-mechanism that is suitable for explaining the most important concepts, while the second will be a rudimentary limb that brings in some further solutions to theoretical problems, as well as indicating the types of practical applications.

Thus, before going into details of the Coorditor-limb demonstration model, some of the basic features of the tensorial operation in a most simple sensorimotor system will be shown, where the sensory and motor frames of reference are identical. This eliminates the problems of different dimensionality of the sensory and motor systems and it also makes some coordinate system transformations unnecessary, thus showing the rest of the operations more clearly.

EXAMPLE 1

The Coorditor-device embodied as an identical input-output coordinate-system mechanism.

The Coorditor information processing system starts and ends with a four-dimensional physical entity: an event-point in the physical four-space that is also called a Minkowski-point. The task of the Coorditor is a transition from this "sensed" event-point back into it, to execute a motor action towards the point. The scheme of this overall sensorimotor system is shown in FIG. 1.

In FIG. 1, the four stages of coordination, i.e., (a) sensation, (b) perception, (c) intention, and (d) execution, are termed according to the common neurobiological usage of words. We will show later that these stages have distinct formal geometrical definitions.

Starting from the primitive physical object of a point (location) in the two-dimensional plane and a simple sensory system, it is possible to demonstrate how the initial theoretical considerations would apply. This example shows, in practical terms, the advantages and disadvantages of the covariant and contravariant vectorial expressions.

The independent covariant vectorial components of point P can be established by setting an origin O with a directioned line segment, and a coordinate axis denoted by $x=x_i$ that originates from 0. (See FIG. 2).

Then, the covariant procedure is finding the shortest distance from P to $x_i$, yielding point A. The distance of OZ is the covariant coordinate of P along $x_i$.

Figure 3A:
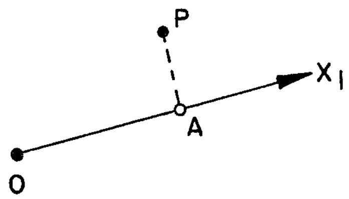
In FIG. 3(A) (1), FIG. 3(B) (2) and FIG. 3(C), four coordinate axes are established. The covariant components of P are obtained by establishing the shortest distance from P to $x_i$, yielding the points A, B, C, D, etc. Each OA, OB, OC, OD covariant component is established by a procedure that yields a unique distance from the origin. Thus, such covariant embedding is a method by which a location in the two-space (usually considered to be a two-dimensional physical object) can be described as a one, two, four, or any higher dimensional unique covariant vectors.

It is evident that the procedure can be independently repeated for any $x_i$ axis where $i=1,2, \ldots n$, i not being limited to 2. (For example, the location P that is normally considered to be a two-dimensional object, is expressed in FIG. 3(C) as a four-dimensional covariant vector.

The above procedure can be physically implemented in many different ways, e.g., by using a sound source ("buzz") at the location P, and a linear microphone such as one used in the commercially available Digital Equipment Corporation "Writing Tablet" (trademark, Digital Equipment Corporation, Maynard, Mass.). Such a single sensor works independently from any others that may be simultaneously present. Thus, with the use of n sensors (as in FIG. 3(C)), the two-dimensional physical object may be embedded into an n-dimensional sensory space. Since the dimensionality of n may be less, equal to or more than that of the object, the sensory space must not be confused with the three-dimensional physical space. To avoid such confusion and to emphasize the potentially very high dimensionality of the sensory space it will be called sensory hyperspace.

Figure 4:
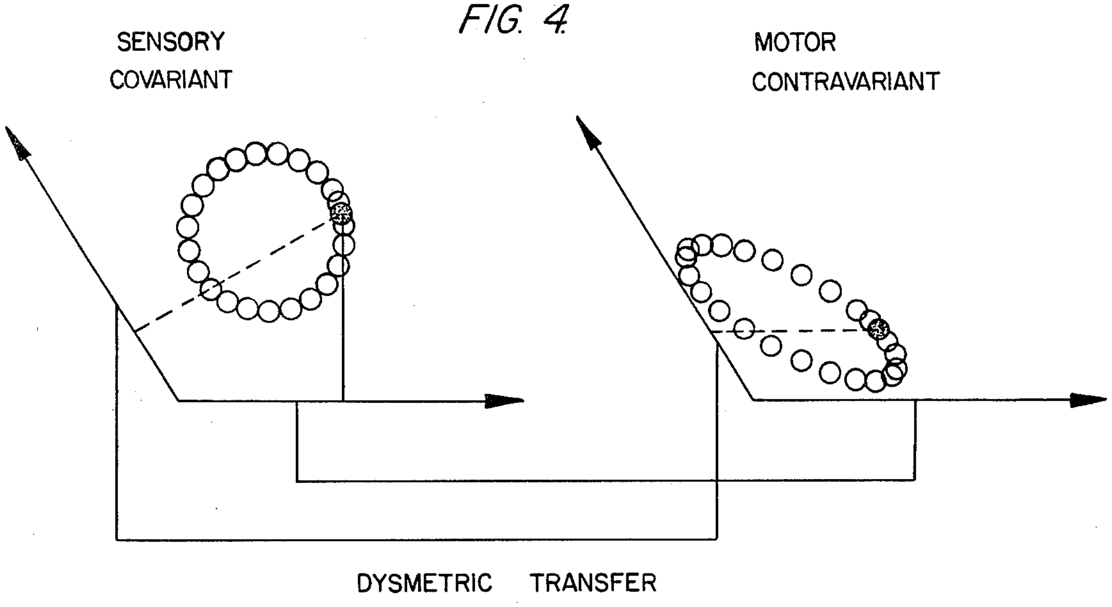
FIG. 4. Dysmetric transfer: covariant sensory components used directly for motor execution. Using identical coordinate systems for the sensory- and motor-processes, the covariant sensory components can be established independently from one another, but they do not physically generate the location from which they are derived. Therefore, a circling point can be "sensed" by mutually independent covariant components, but these covariants, when used as if they were contravariants, will yield a distorted motor performance.

While the independence of covariant coordinates is advantageous for sensory systems (e.g., a mistake in establishing one does not alter the other), it is evident in the above examples that covariants cannot be used directly to physically generate the vector. As shown in FIG. 4, the covariant components cannot be used directly to execute the movement. Without an in-between metric tensor the "dysmetric" direct usage of covariant components (as if they were executable contravariant components) yields a distorted performance (see FIG. 4).

Figure 3B:
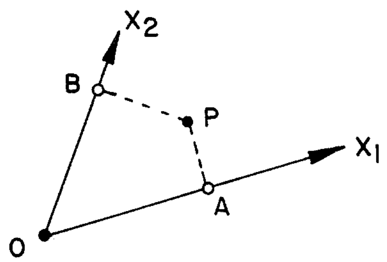
FIG. 3. Covariant embedding of physical point.
Figure 3C:
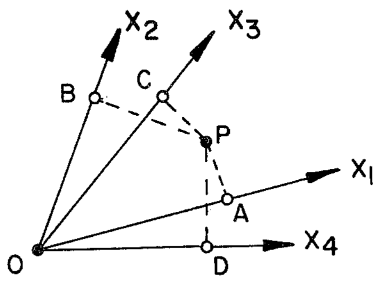

It can also be seen, e.g., in FIG. 3(B), that the physical addition of OA and OB will not generate the OP vector. To actually generate such vectorial objects as displacements the contravariant-type vectors, so-called physical components have to be used, such as the well-known parallelogram components. The basic question therefore is how can the contravariant components that are necessary to execute the movement be obtained from the sensory covariant components?

Figure 5:
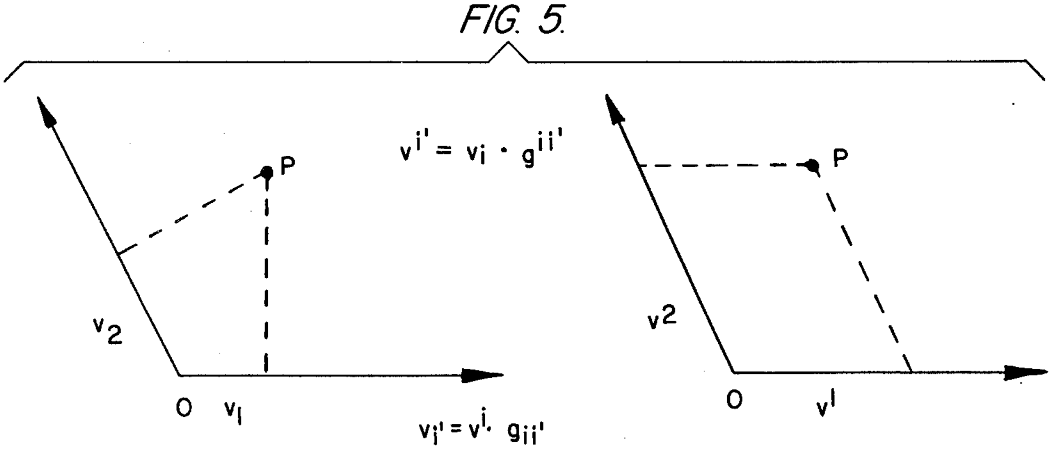
FIG. 5. Covariant and contravariant relation. The covariant and contravariant representations of a physical object can be transformed into one another by using a mathematical device, known as the metric tensor. The $g^{ii'}$ contravariant metric transforms the covariant vector $v_i$ into the contravariant counterpart: $v^i$, while the $g_{ii'}$ covariant metric tensor performs the transformation into the opposite direction.

Mathematically speaking (see FIG. 5), there is a general tensor transformation that brings $v_i$ into $v^i$ (and another, vice versa). This entity, expressed in a coordinate-free manner, is the so-called metric tensor; $g_{ii'}$, in covariant form, and $g^{ii'}$, in contravariant form. Whenever the metric tensor is expressed in a particular coordinate system, it becomes an $i \times i$ matrix (e.g., for a three-dimensional vector the metric tensor is a matrix of $3 \times 3$ elements). The elements of the matrix can be calculated by a formula that depends on the angle between the coordinate axes. For a simple numerical example, the contravariant metric tensor for a two-dimensional coordinate system where the angle of the axes is w, is the following matrix:

$$g^{ii'} = \begin{pmatrix} 1/\sin^2 w & -\cos w/\sin^2 w \\ -\cos w/\sin^2 w & 1/\sin^2 w \end{pmatrix}$$

For the particular frame of reference where w=120°, the above formula yields the metric tensor in the form of this simple matrix:

$$g^{ii'} = \begin{pmatrix} 4/3 & 2/3 \\ 2/3 & 4/3 \end{pmatrix}$$

Figure 6:
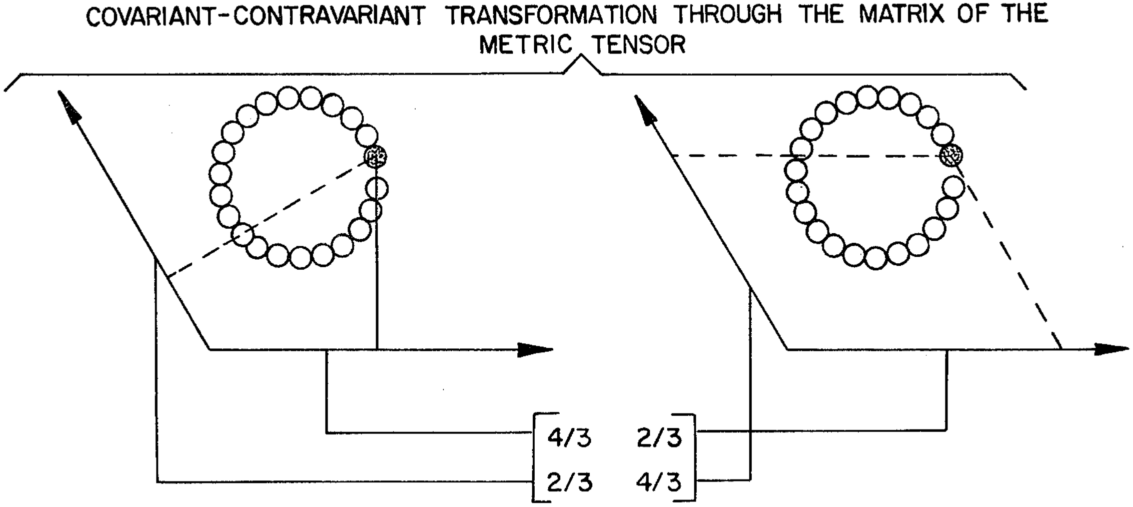
FIG. 6. Covariant-contravariant transformation through the matrix of the metric tensor. The contravariant metric tensor in a non-curved (flat) two-dimensional space is a symmetrical 2×2 matrix, whose elements (if the coordinate system is of 120°) are the constants as indicated in the Figure. This matrix is capable of transforming the two covariant components of the location of a moving target into physically executable contravariant components that will yield a movement exactly the same as in the sensory system.

Therefore, as shown in FIG. 6, the two-vector of the "sensed" covariant components, when multiplied by a $2 \times 2$ matrix, will yield such contravariant components that will execute the desired circular movement.

Such metric tensor transformation may be the function that some neuronal networks are supposed to perform in the central nervous system. Suppose, for example, that an executor system is such that it represents the same frame of reference as the sensors, e.g., set up a rudimentary executor system that is basically the identical oblique coordinate system as the sensory one. Such a system is shown in FIG. 7.

In the symbolic mechanism to the right, the $r_a$ and $r_b$ rods can be advanced, e.g., by suitable cogwheeled motors, to any length determined by the A and B contravariant coordinates.

Therefore, this sensorimotor system would immediately work, if the a,b covariant components could somehow be transferred into A, B contravariant components of the same vector. Such a transformation implemented by a simple "neuronal network" is shown in FIG. 8.

The neuronal network in between the sensory and motor systems is a rudimentary system of connections from two input "neurons" to the two output elements. Therefore, the output A,B is exactly the (a,b) vector, multiplied by the necessary $g^{ii'}$ matrix, that serves as the metric tensor for the 120° coordinate system:

$$v^{(A,B)} = g \cdot v_{(a,b)} \text{ where}$$

$$g = \begin{pmatrix} 4/3 & 2/3 \\ 2/3 & 4/3 \end{pmatrix}$$

The "metric transformation" therefore requires only "neurons" which:

(a) multiply an input signal by a constant; e.g., by one third in the neurons on the left side of FIG. 8;

(b) sum the input signals (e.g., neurons on the right side of FIG. 8);

(c) connect the input and output elements so that the number of connections between the i-th input and j-th output neurons are proportional to the i,j-th element in the matrix of the metric tensor.

It will now be readily apparent that the metric tensor function is readily accomplished by electronic means. For example, the multiplicative functions of neurons of FIG. 8 may be carried out by conventional amplifiers and the additive functions may be carried out by summary amplifiers. A schematic of electronic means serving as a metric tensor is shown as part of FIG. 16.

In this simple identical sensory and motor coordinate system mechanism, if the location of the object changes with time (e.g., the object circles in the two-dimensional plane), the two acoustic sensors can take the two covariant components, which are, in turn, connected to two input neurons that are connected by a network to the two output neurons. The output neurons provide exactly those contravariant vector components that will drive the motor executor system to the required point so that there is a spatiotemporal coincidence of the motor system with the target (see FIG. 9).

Figure 9:
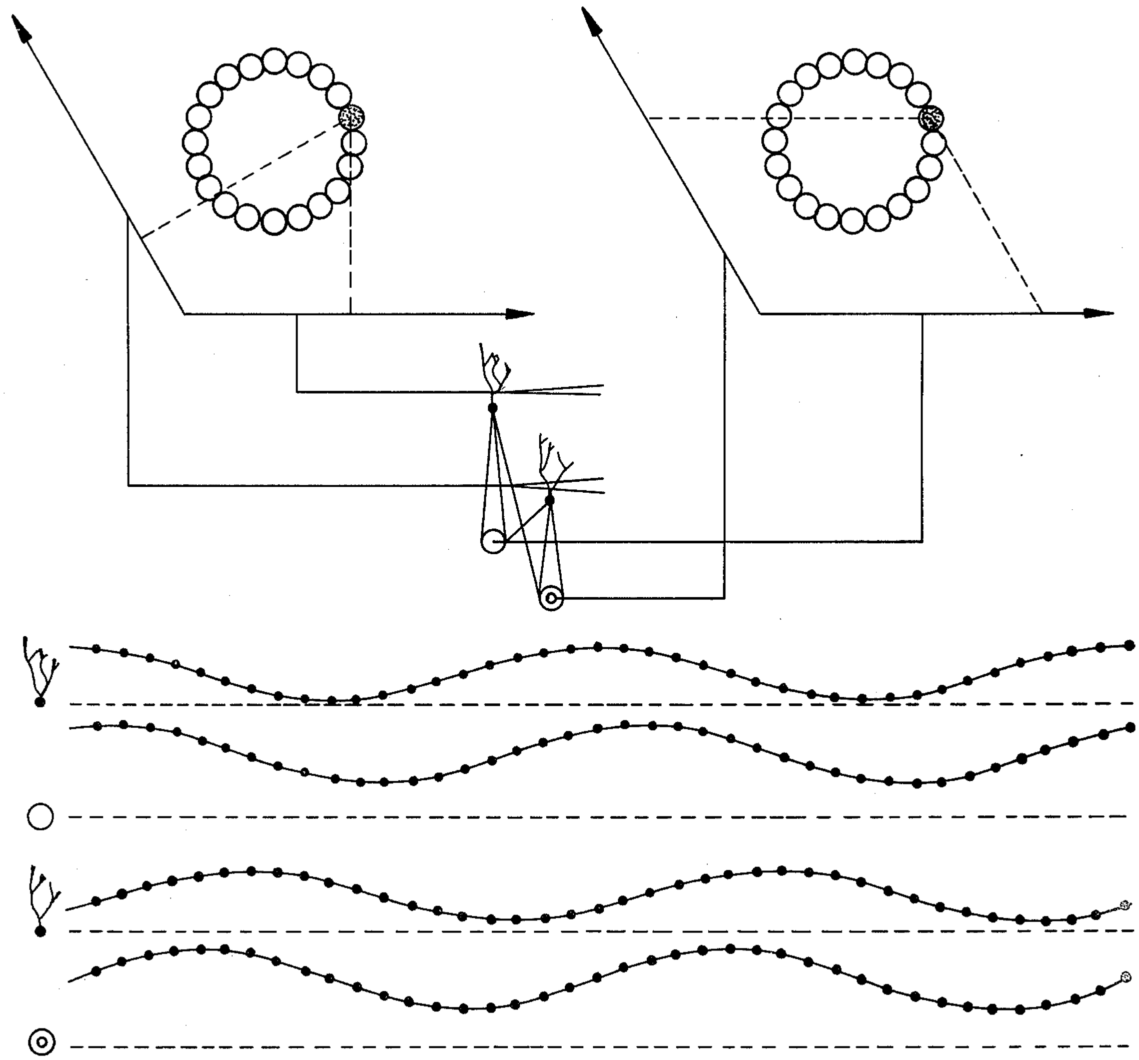
FIG. 9. Metric transformation of simultaneous space coordinates.

In FIG. 9 it is of additional interest that the circling target generates time functions that are sinusoidal covariant components (the amplitude and the phase of them being different; see bottom part of FIG. 9). Likewise, the contravariant output is also the sum of sinusoidal waves. From such elementary functions, as in experimental brain research, it would be very difficult to infer the principle of the function of the total sensorimotor system.

Figure 10:
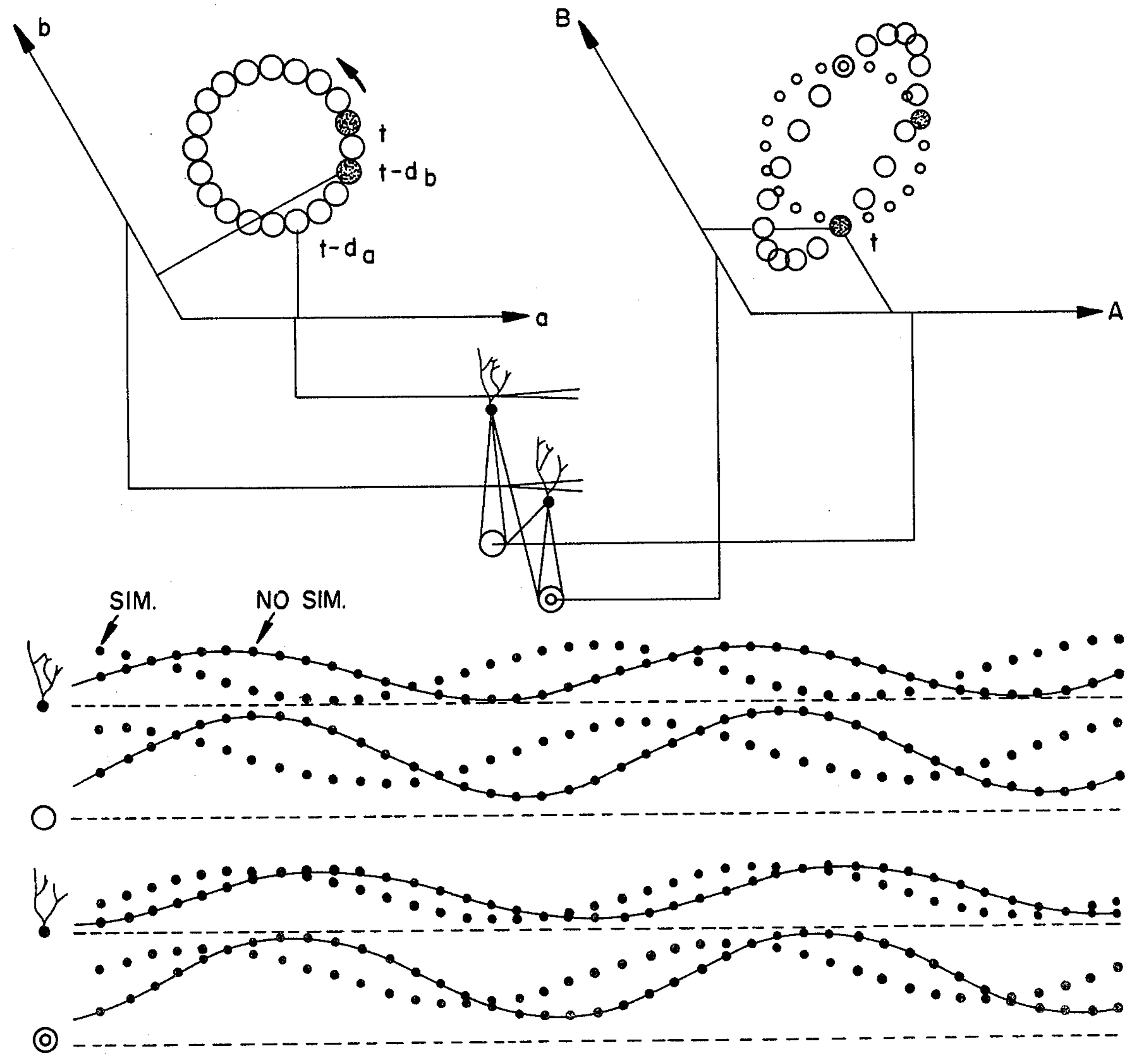
FIG. 10. Transformation of asynchronous coordinates via space-metric showing effects with and without time delay compensation. The sensory covariant components (on the left) are permitted to incorporate individually different delays in detecting the location of the moving (circling) target. If the delays along sensor a is $d_a$ and while along b is $d_b$, then the covariants refer to asynchronous locations of the target at t-$d_a$ and t-$d_b$, respectively. If these covariants were taken as referring to simultaneous events (sim), and were transformed by a network that represents the metric tensor of the space only, then the motor execution would be distorted into an oval (as seen on the right side). In the bottom part of the figure, the delayed time functions are shown by continuous lines (yielding the distorted motor performance), while the simultaneous signals (exactly as they were in FIG. 9) are shown by dotted lines, for comparison.

The above-described model is restricted to operate when the sensory- and motor-elements work without any time delay; i.e., the sensors and effectors are instantaneous and thus the system is synchronous. However, in reality this usually is not the case. Therefore, one must consider that each of the two sensors may contain some delay, the $d_a$ and $d_b$ delays being different. As shown in FIG. 10, such a delayed covariant component reports at time t, not on the position of the target where it was at time t, but the a covariant component will give the position of the target at the time-point t-$d_a$ and, similarly, b will give the position at t-$d_b$. The time-functions of the covariants and contravariants are shown in the bottom part of FIG. 10 for both the cases of simultaneity (the signals shown by dotted lines) and for the delayed, non-simultaneous signals (shown by continuous lines). As seen, the difference from simultaneous to delayed, non-simultaneous case is in the phase of the sinusoidal time functions. If the metric transformation in such an asynchronous system were performed on the delayed components themselves, the contravariants would yield a distorted, elliptical movement, instead of the circular one (see FIG. 10).

The solution for such an asynchronous system requires a temporal "prediction" of future values of the covariant components. The concept of predicting space-time components of the moving target is shown in FIG. 11.

The idea here is to start with the delayed covariant components, such as a, at time-point t-$d_a$, and by a method described in Pellionisz and Llinas, *Neuroscience*, 4, 323 (1979), to obtain a temporal lookahead-value of a that refers to t. This procedure is based on experimental evidence that some of the many neurons that receive the a signal are capable of producing the zero-, first-, and even the second-order time derivative of a. (c.f., Pellionisz and Llinas, supra). If such derivatives are summed according to coefficients in a Taylor-series-like expansion of the a(t) function, then a temporal lookahead of a(t) can be generated. Therefore, instead of single neurons projecting from a to A, the system uses "stacks" of neurons, where each receives the same input and a certain number of them take 0-th derivative, while others take 1st- and 2nd-derivatives. Thus, the simple neuronal network in the center of FIG. 11 acts as a space-time metric tensor, and thus the execution of the contravariant components (which belong now to the same t time-point) yields a perfect execution.

Figure 11:
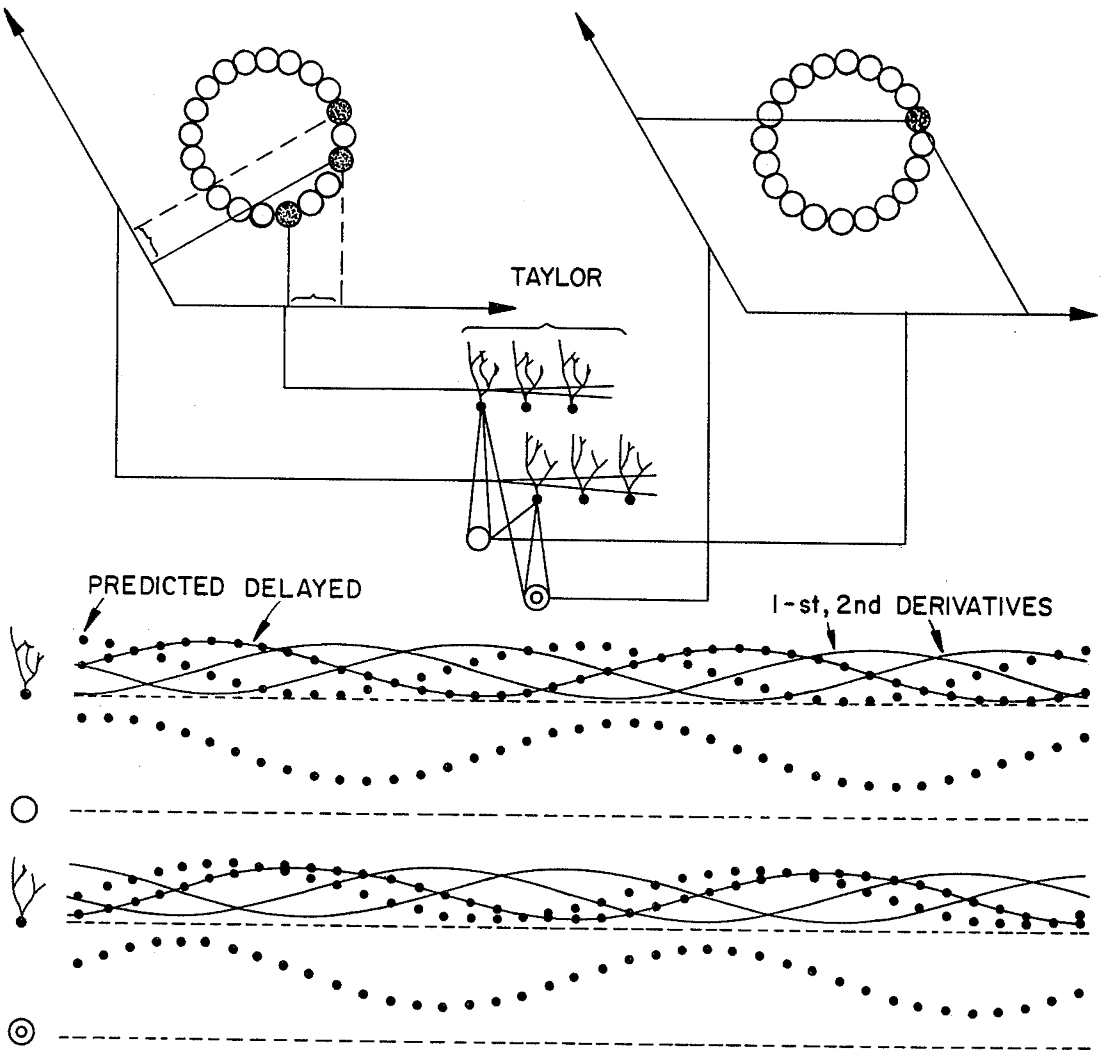
FIG. 11. Predictive space-time metric tensor. The covariant a, b components incorporate $d_a$ and $d_b$ delays, respectively. (These "delayed" signals are shown in the bottom by dotted continuous line). If these delayed signals undergo a temporal "lookahead" procedure (c.f., Pellionisz and Llinas 1979), they yield a set of "predicted" signals (shown by dotted lines in the bottom). Since the "predicted" signals are simultaneous covariant coordinates of the moving target, a metric transformation on them yields undistorted circular movement execution. For the "temporal lookahead" procedure 0-th, first and second time derivatives of the covariant sensory signals have to be taken (by "neurons" shown in the middle part of the figure, their signals plotted in the bottom part of the figure by continuous lines). From such "Taylor-series"-like expansion of the covariant sensory signal, the "lookahead" signal is obtained by "neurons" that will take the weighed sum of derivatives.

Several comments may be made even about the rudimentary space-time coordinator device shown in FIG. 11. Most important of all, the simple neuronal network, which serves as a space-time metric tensor, contains not only summator neurons, but also such neurons that must take first- and even second-order time derivatives of the incoming function. Therefore, to call such a tensorial system linear just because tensor treatment is usually applied to linear systems, is clearly mistaken; first- and second-derivatives are non-linear functions and thus the space-time coordinator system is a non-linear tensorial system.

The temporal extrapolation function can be carried out by electronic means. FIG. 16 shows a diagram of an example of electronic means suitable for generating temporal lookahead values for the covariant components. It will be understood that the complexity and the number of channels of such electronic means will increase with the number of sensory input channels and that each channel will incorporate correction values appropriate to the time delay of the corresponding input.

EXAMPLE 2

The Coorditor device embodied as an artificial limb.

In the first example, the sensory- and the motor-execution systems were identical; thus, the problems to solve were only (a) the transformation from covariant sensory signals to contravariant motor signals, and (b) the handling of asynchronous sensory and motor signals in a manner such that their individual delays were compensated for. Both these problems could be solved by a single mathematical device with corresponding electronic analog, a predictive matrix-network that functioned as a space-time metric tensor.

However, in most applications the input sensory- and output motor-systems use different coordinate systems, where the difference may even be twofold: (a) the direction of the coordinate axes in the sensory system may differ from that of the motor system, and (b) the dimensionality of the sensory- and motor-systems (the number of coordinate axes) may also be different.

The difference in the coordinate axes presents no major conceptual problem, since the same solution could be used as above, except that an additional coordinate system transformation matrix is applied. This additional matrix must first transform the contravariant motor execution vector (expressed in sensory coodinates) into another contravariant vector, expressed in the motor coordinate system. This intermediate case is illustrated in FIG. 12.

An important comment is necessary for such a case when the sensory and motor coordinate systems are different. As shown in FIG. 12, the transformation from covariant sensory coordinates to the contravariant motor coordinates involves a previously described space-time metric which is now multiplied by the transformation matrix from the sensory frame to the motor frame of reference. Since the two matrices can be combined into a single network, in such cases the connectivity matrix will only implicitly have the characteristic features of a metric tensor (e.g., the resulting matrix may not be symmetrical, etc.). Such a case lies within the contemplated scope of the invention, despite the fact that the metric tensor means is integrated with other functions. In all instances herein, the functions are described separately for convenience of exposition and clarity of understanding, whereas in practice the means for carrying out such functions may be integrated with, or share components with, means for carrying out other functions.

In the most sophisticated types of application, the sensory and motor frames of reference may be different both in the directions of the axes and in the dimensionality, the number of axes. Such is the case in the second examplary device, the Coorditor-limb. Beyond presenting a solution for the new additional conceptual problem, this example also serves two practical purposes: (a) suggests not only conceptual, but practical applications for the Coorditor-device, and (b) provides a "hardware" solution that uses "neuronal networks" and analogous electronic components in a manner such that not only the principle of operation of the Coorditor and the corresponding part of the brain, the cerebellum, is as close as possible, but so also is the actual implementation of the functioning of the mechanism.

Therefore, the Coorditor-limb device is presented in two steps: (a) first, the vectorial-tensorial scheme is presented, providing a tensorial solution for the additional problems brought about by the use of the different and over-complete motor coordinate system, and (b) then a tensorial solution is presented in the form of using "neuronal networks" or electronic components that yield "brain-like" implementation of the device.

(a) The tensorial concept of the Coorditor limb.

In order to maximize the clarity of the application of Coorditor-principle, the demonstration device is kept to the simplest possible: a "limb", composed of only three segments and three joints, so that the limb moves in the two dimensions of the plane. In spite of this simplification, a model which explains a two-dimensional movement by a three-dimensional executor system can explain the coordination of n-dimensional movements by N-dimensional executor systems (where N is greater than n) for any n and N, no matter how large these numbers may be.

Assume that the task of the limb is to intercept a point P in the two-dimensional plane, where P moves with a speed so that the delays in detecting the position of the point and the delays in reacting to it will cause significant error in the execution. It is obvious that this space-time coincidence performance is both a very simple one, and at the same time it conceptually represents the essential control paradigm. Thus, it is a clear demonstration of the Coorditor principle: it shows how such performance is similar to the biological execution and it is also suggestive enough to signal that the Coorditor control paradigm may be applied to widely different space-time coordination tasks. The scheme of the Coorditor-limb is shown in FIG. 13.

The sensory system is basically the same as in the previous example. The sensory frame of reference is oblique. In the a covariant sensory coordinate-component, both the x and y spatial coordinates are represented in a mixed form. Assuming that the process of establishing the separate a,b, etc., covariant components involves a time-delay that is different for each coordinate axis, it is apparent that in each covariant sensory component all x,y,t coordinates are represented again, in a mixed form.

Thus, for a point P(x,y,t) the covariant sensory coordinates at time t will be a and b, where a and b both depend on x and y positions of the point where it was before a $d_a$ or $d_b$ delay, respectively. Such individually different delays in establishing a sensory component occur in the nervous system where the neuronal axons conduct the signals not significantly faster than the speed of the body movement itself (both being in the range of 100 m/sec). Similar considerations apply, with appropriate modification of the time constants, to electronic sensory signals and to mechanical, or other output means, effector delays. The Coorditor is a device, then, that makes it possible to establish a space-time coincidence of the effector with the target in spite of the fact that the movement is observed by the sensory system with considerable delays, moreover, the sensors provide the mixed space-time coordinates.

The proposed operation is performed in three steps: (1) a covariant embedding; (2) a temporal extrapolation of the individual covariant components by $t_a$, $t_b$, $t_c$, etc., in order to arrive at a set of covariant components such that every one of them refers to one and the same P point at time t; and (3) a metric transformation of the covariants into contravariant components.

If in the effector system there is a different delay in the execution of each contravariant component, then step (2) may also have to be repeated at the executive end. By this procedure, by extrapolating in time each contravariant component, the different delays inherent in the functioning of the executing elements can be compensated for.

As for the motor executor system in FIG. 13, in the Coorditor-limb the sensorimotor act of reaching from the point O to point P is restated not just vectorially, but tensorially. The mechanical limb is moved by changing its p,q,r angles, which procedure is supposed to execute the OP displacement. This physical object of OP is usually expressed in the x,y,t Euclidean space reference-frame with the use of centralized clock time reference-frame (the two together usually being called the Newtonian space-time coordinate system). In this frame of reference, the displacement is a three-dimensional x,y,t object, since z is not used in the case shown. With the motor execution system of the limb, this displacement must be generated in the form of a four-dimensional OP (p,q,r,t) vector. In addition, as was pointed out, the OP displacement is "sensed" in an oblique non-synchronous frame of reference by the a and b covariant components that refer to positions at t-$d_a$ and t-$d_b$ time points.

It follows that since all OP (x,y,t), OP(a,b,t) and OP(p,q,r,t) vectors refer to the same physical object (except that they use different frames of references) and since tensors are defined as reference-frame invariant vectorial expressions, the Coorditor-limb system is, by definition, a tensorial system.

As mentioned, beyond the necessary predictive covariant-contravariant space-time metric tensor, particular attention should be devoted in this case to the problems that in the Coorditor-limb the sensory coordinate system is different both in the directions of the coordinate axes and in their number; the motor executor system uses three space and one time coordinate, while the sensory system uses only two space and one time coordinate.

The key to how to increase the dimensionality in a unique manner is the process of covariant embedding, already introduced in a primary form earlier in this disclosure. The geometrical scheme of the application of covariant embedding to the case of Coorditor-limb is shown in FIG. 14.

Figure 14:
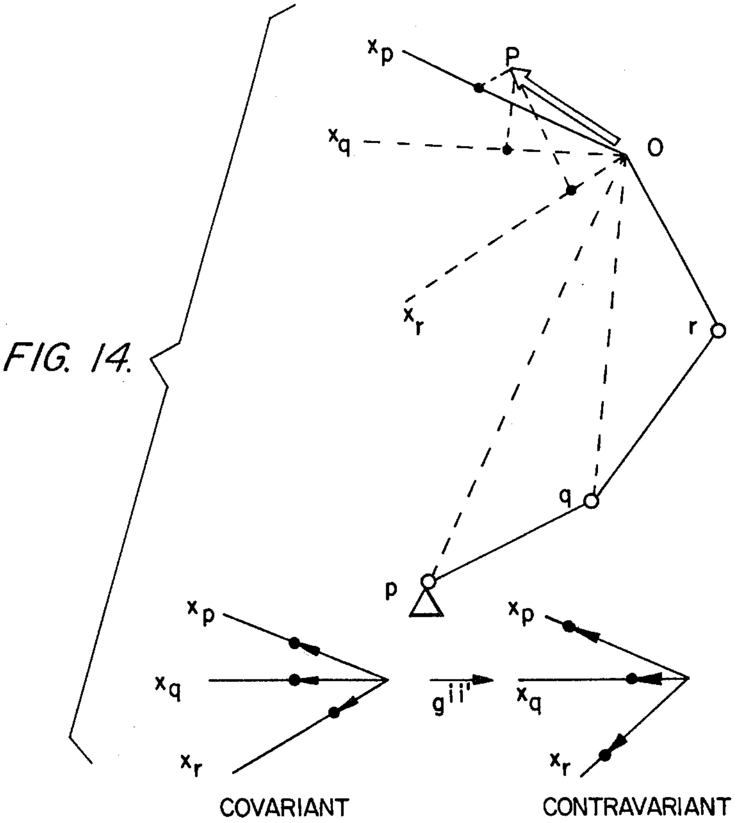
FIG. 14. The geometric scheme of covariant embedding and covariant-contravariant metric transformation in the Coorditor-limb device. The three-segment arm system, composed of $R_1$, $R_2$, $R_3$ can be moved by changing the p, q, r angles between the segments. In order to generate a OP displacement of the arm, the p, q, r contravariant components have to be obtained. This requires an increase in dimensionality from the OP two-vector to the OP (p,q,r) three-dimensional vector. By establishing the local coordinate system at O, indicating the direction of the displacement of the arm when p, q, r are changed separately, the covariant components of OP can be established uniquely and independently from one another (c.f.

Since the O end-point of the Coorditor-limb can be moved by changing the p,q,r angles between the segments of the arm, the first step in FIG. 14 is to establish the coordinate axes that the infinitesimal separate p,q,r changes would represent at the point of O. As shown in FIG. 14, changing only the angle p would move the rigid $R_1$-$R_2$-$R_3$ limb into the direction of $x_p$. Similarly, changing only q would move P along the direction of $x_q$ and changing r would move P along the axis of $x_r$.

It should be noted that in FIG. 14, the $x_{p,q,r}$ coordinate system is shown as if it were rectilinear, while in reality it is only locally rectilinear. In addition to this curvilinear character, the coordinate system is also dependent on the position of O. Mathematically speaking, these comments mean that the p,q,r space is not flat but curved.

Figure 2:
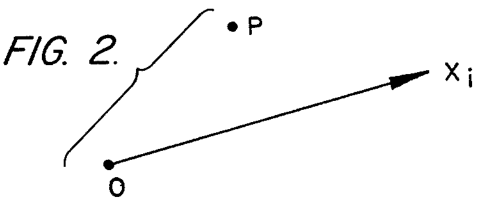
FIG. 2. A physical point and a coordinate system. A physical entity, e.g., a point in a two-dimensional plane, can be expressed vectorially by means of establishing coordinate axes. Coordinate axis $x_i$ originates from O, and along $x_i$ a certain distance is characteristic, according to one or another definition, to the location of P.

Once the local $x_{p,q,r}$ coordinate system at O is established, the covariant components of OP along $x_p$, $x_q$, $x_r$ can be obtained by the procedure shown in FIGS. 2 and 3. While the transition from the spatially two-dimensional OP to the spatially three-dimensional OP (p,q,r) suffices for increasing the dimensionality, one will note that such p,q,r covariants cannot be directly used to change p,q,r in order to correctly generate OP (c,f., FIG. 4). Therefore, again a metric tensor of the p,q,r space is required that can transform the covariant OP (p,q,r) vector into its contravariant counterpart (c.f., FIG. 14, bottom).

Therefore, in the total Coorditor-limb system the predictive space-time metric tensor has to be applied two times: (1) once in the sensory end, in order to produce from the asynchronous covariant sensation components a synchronous contravariant sensory perception vector (both expressed in sensory frame of reference). When the contravariant synchronous perception vector is available, a covariant embedding of this vector into the p,q,r-space will yield a covariant intended movement vector. In order to compensate for the individual delays incorporated in p,q,r executors, this intended movement vector then has to be extrapolated, "looked ahead" in time. Then, using a second, motor space-time metric tensor, the synchronous contravariant execution of OP (p,q,r) can be obtained. This control scheme could be further elaborated showing how particular "neuronal networks" may provide the procedure described above.

An electronic means for achieving covariant embedding of a sensory input signal is shown in FIG. 16, for the simple case of a single input channel and two-dimensional coordinate system. It can be seen that the same structural and correctivity relationships can be applied for inputs and N coordinate axes.

Figure 15:
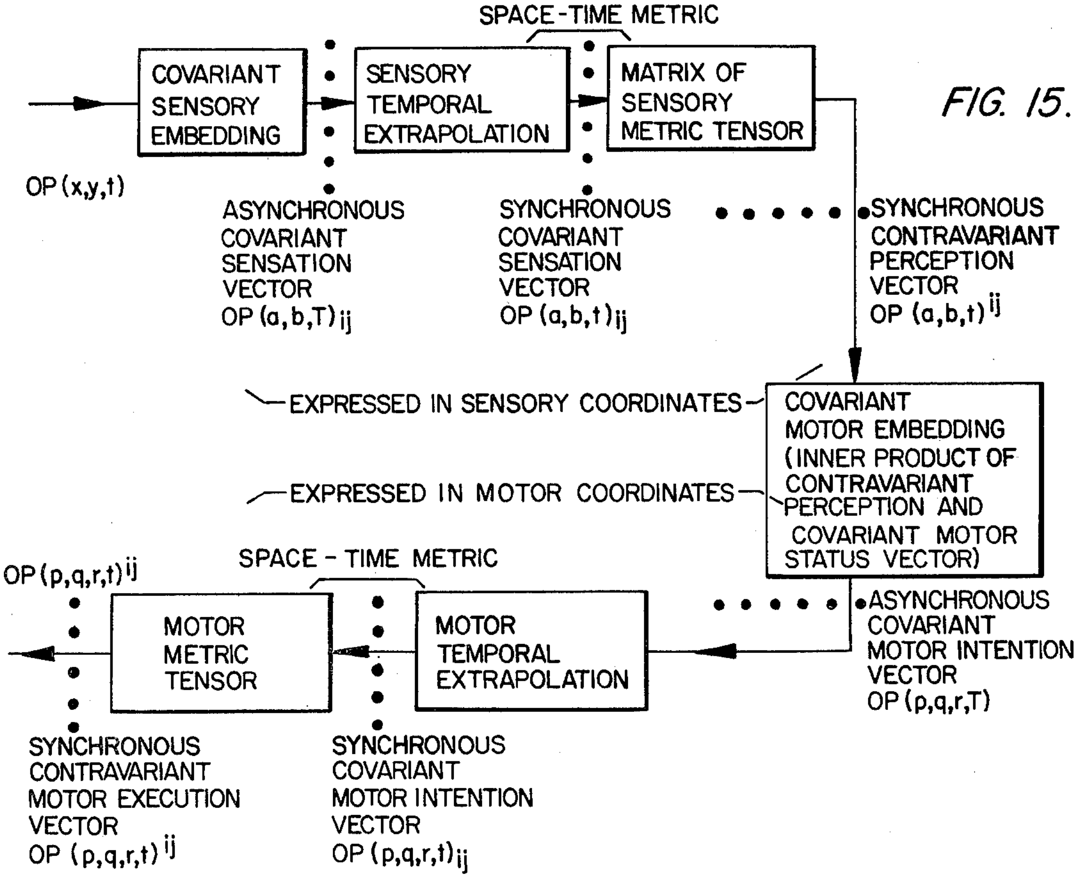
FIG. 15. Schematic diagram of the Coorditor-limb device. The three upper blocks constitute the sensory part of the system, while the three lower blocks perform the motor function. The overall structure of the sensory and motor system is similar: both start with a covariant embedding followed by a temporal extrapolation that compensates for the delays of the sensory or motor executor elements respectively, and the final stage in both is a transformation of the covariant vectorial expression into a contravariant one. The covariant sensory embedding can be accomplished by commercially available linear microphones or other similar means that measure the gradient of the presented physical object. The covariant motor embedding, on the other hand, is performed by taking an inner product of the contravariant perception vector and covariant motor status vector. The detailed circuitry diagram of these blocks is shown in FIG. 16.
Figure 16A:
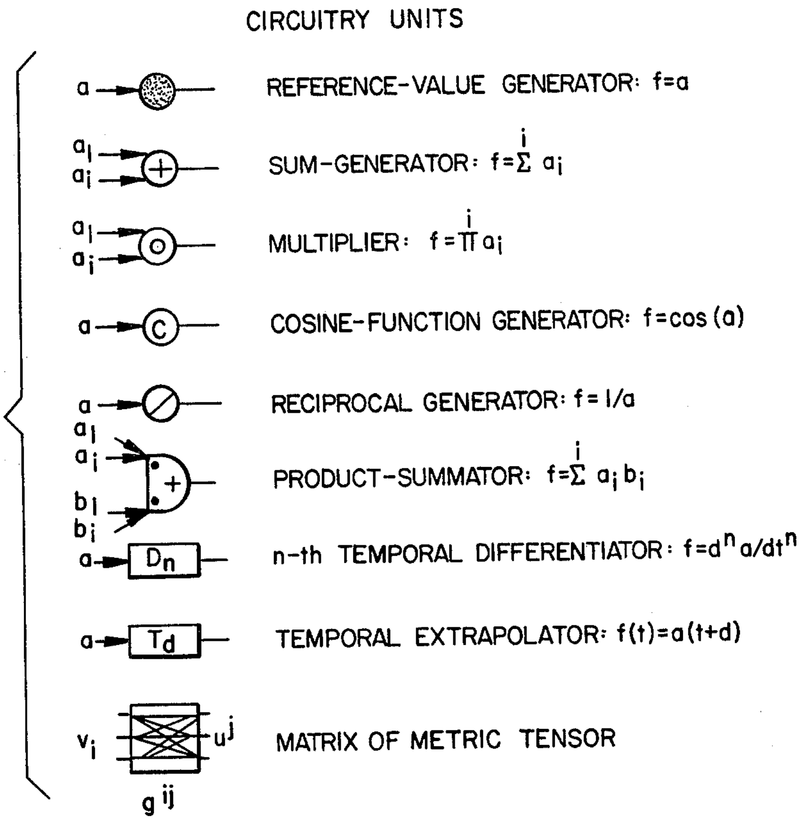
FIG. 16. Detailed circuitry diagram of a hardware realization of the Coorditor-limb device.
Figure 16B:
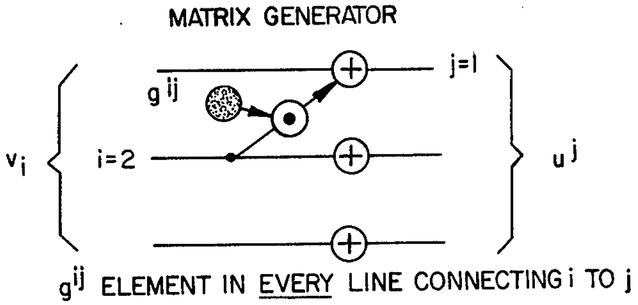
Figure 16C:
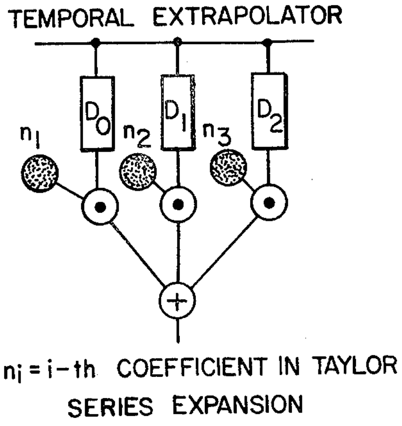
Figure 16D:
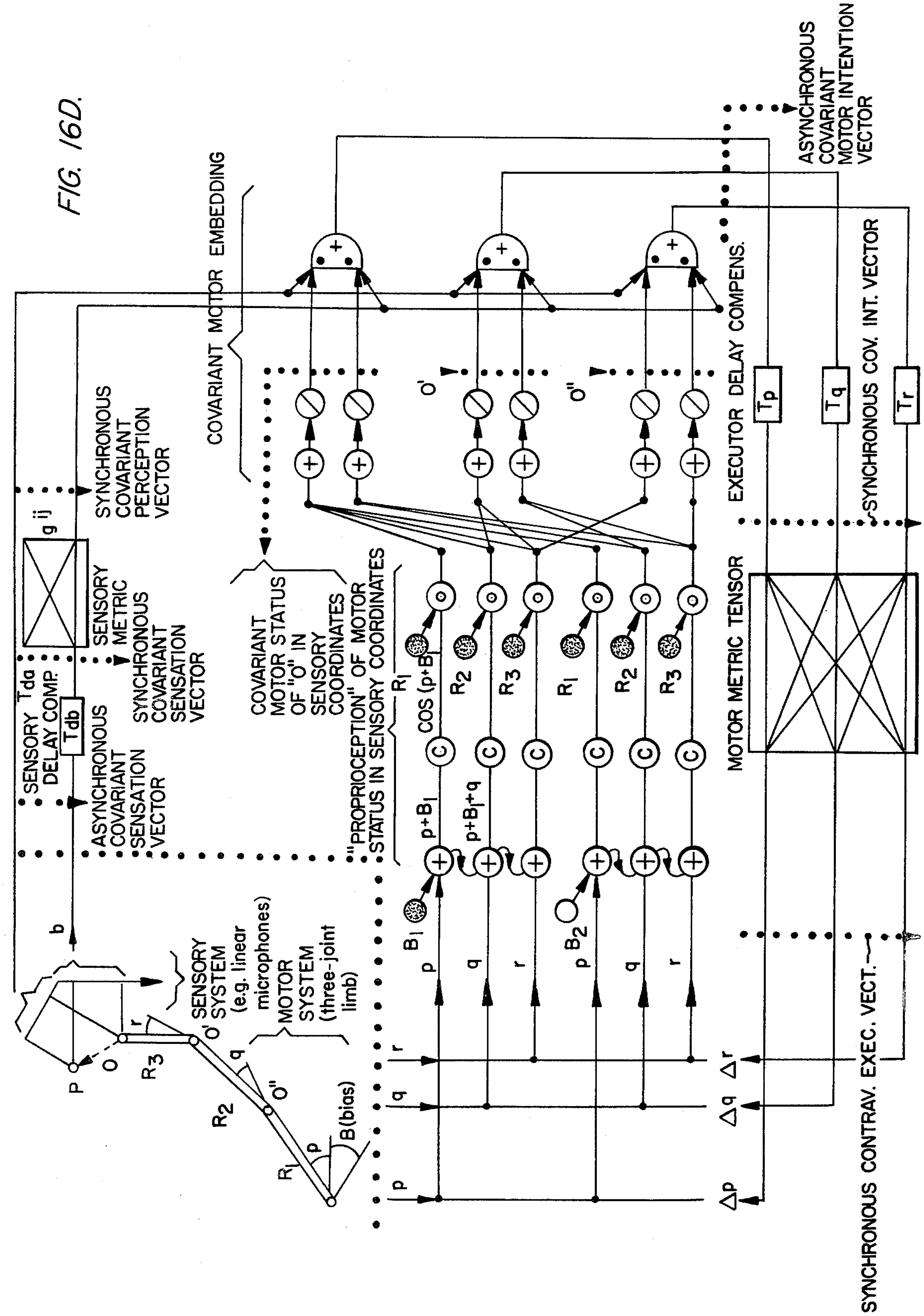

A schematic diagram of the electronics components of the Coorditor limb system and the interrelation of the components is shown in FIG. 15. Detailed electronic schematics of the various operating components are shown in FIG. 16.

GENERAL CONCLUDING REMARKS

The invention described herein offers a fundamental departure from prior art information processing systems. In consequence, emphasis has been placed on the operating principles of the invention, as illustrated by simple applications. Means for achieving the operation of the described components are currently available. It is understood that other alternative means, accomplishing equivalent functions can be devised, within the scope of ordinary skill in the art, to construct a Cognitor or a Coorditor device. Such equivalents are deemed within the scope of the invention, which follows from the principles and teachings of the specification and the appended claims.

What is claimed is:

1. An information processing system to coordinate sensory input signals with motor-effector means, using oblique systems of coordinates for processing sensory input information in covariant vectorial form and providing output motor-effector information in contravariant vectorial form, comprising:

(a) covariant embedding means for expressing sensory input signals in an n-dimensional vector by N components in a covariant vectorial expression, where N is greater than n;

(b) covariant-contravariant transformation means for obtaining contravariant expressions from said covariant vectorial expression, said transformation means expressible as a tensorial transformation; and (c) contravariant vectorial expression means for providing output information to a motor effector means relative to an external invariant.

2. An information processing system according to claim 1, wherein the operation of the covariant-contravariant transformer is expressible as a metric tensor.

3. The information processing system of claim 1, comprising a sufficient plurality of functional elements to provide an over-complete number of said elements relative to the minimum number required to process all input and output information.

4. A device for coordinating sensory input signals with a higher dimensional motor-effector means, and compensating for any time delays in the sensory input system comprising:

(a) a covariant sensory input embedding system operating upon said sensory input signals;

(b) a temporal extrapolation system to compensate for any time delays in said sensory input system;

(c) a covariant-contravariant transformation matrix to provide physical execution signals expressed in sensory frames of reference;

(d) a covariant embedding system operating upon said physical execution signals to provide motor-intention signals expressed in a motor coordinate system;

(e) a temporal extrapolating system to compensate for any time delays in the embedding system; and (f) a covariant-contravariant transformation matrix to provide information to a motor-effector means.

5. A sensory motor device according to claim 4, comprising an additional temporal extrapolation system to compensate for any time delays in the motor effector means.

6. A sensory motor device according to either of claims 4 or 5, wherein the operation of the coordinate-covariant and coordinate transformation matrix is expressible as a tensorial transformation.

7. A sensory motor device according to either of claims 4 or 5, wherein a temporal extrapolation system operates according to a Taylor series expansion.

8. A sensory motor device according to either of claims 4 or 5, wherein the number of its components is over-complete with respect to the minimum number required to coordinate the sensory input signals and motor effector means.

9. A method of processing information to coordinate sensory input signals with motor-effector means using oblique systems of coordinates, comprising the steps of:

(a) embedding sensory input information in the form of a covariant vector whereby an n-dimensional vector is expressed by N components, where N is greater than n; and (b) transforming the covariant vector to a contravariant vector and expressing output information in the form of said contravariant vector to a motor-effector means.

10. The method of claim 9, wherein the step of transforming a covariant vector to a contravariant vector is carried out by a process symbolically expressed by $v^n = g^{nn'} \cdot v_{n'}$, wherein $v_n$ is a covariant vector in n dimensions, $v^{n'}$ is a contravariant vector in n' dimensions, and $g^{nn'}$ is a metric tensor in contravariant form comprising a matrix of $n \times n'$ elements.

11. The method of claim 9, wherein the transforming step is expressible as a tensorial transformation.

12. A method of coordinating a sensory input signal with motor effector means, comprising:

(a) embedding a sensory input signal in the form of a covariant vector in an oblique coordinate system, whereby an n-dimensional vector is expressed by N components, where N is greater than n;

(b) temporarily extrapolating the covariant vectors to compensate for any time delays in the sensory input system;

(c) transforming the covariant vector to a contravariant vector, thereby producing a contravariant output vector; and (d) activating the motor-effector means with the contravariant output vector.

13. The method according to claim 12, wherein the transforming step is expressible as a tensorial transformation.

14. The method according to either of claims 12 or 13, wherein the transforming step is carried out as symbolically expressed by $v^n = g^{nn'} \cdot v_{n'}$, wherein $v_n$ is a covariant vector in n dimensions, $v^{n'}$ is a contravariant vector in n' dimensions, and $g^{nn'}$ is a metric tensor in contravariant form comprising a matrix of $n \times n'$ elements.

15. The method according to either of claims 12 or 13, wherein the temporal extrapolating step operates according to a Taylor series expansion.

* * * * *

UNITED STATES PATENT AND TRADEMARK OFFICE
CERTIFICATE OF CORRECTION

PATENT NO. : 4,450,530

DATED : May 22, 1984

INVENTOR(S) : Andras J. Pellionisz; Rodolfo R. Llinas

It is certified that error appears in the above-identified patent and that said Letters Patent are hereby corrected as shown below:

On the title page:

In the heading:

[75] Inventors: Andras J. Pellionisz;
Rodolfo R. Llinas, both of New York, N.Y.

Signed and Sealed this

*Fifth* Day of *March 1985*

[SEAL]

*Attest:*

DONALD J. QUIGG

*Attesting Officer* *Acting Commissioner of Patents and Trademarks*